United States Patent [19]

Spirig

[11] 4,078,714
[45] Mar. 14, 1978

[54] DESOLDERING METHOD AND APPARATUS

[76] Inventor: Ernst Spirig, Moevenstrasse 37, CH-8640, Rapperswil, Switzerland

[21] Appl. No.: 743,099

[22] Filed: Nov. 19, 1976

[30] Foreign Application Priority Data

Oct. 18, 1976 United Kingdom .............. 43201/76

[51] Int. Cl.² ............................................... B23K 1/00
[52] U.S. Cl. ..................................... 228/264; 29/426; 228/19
[58] Field of Search ............................. 228/19, 21–23, 228/56, 35, 264, 191–193; 29/426, 489, 495

[56] References Cited

U.S. PATENT DOCUMENTS

| 2,972,657 | 2/1961 | Stemke | 228/56 X |
| 3,358,898 | 12/1967 | Medkeff | 228/56 |
| 3,627,191 | 12/1971 | Hood | 228/19 |
| 3,715,797 | 2/1973 | Jackson | 228/19 X |
| 3,895,214 | 7/1975 | Winter | 228/19 X |

*Primary Examiner*—Donald G. Kelly

*Attorney, Agent, or Firm*—Lawrence E. Laubscher

[57] ABSTRACT

In desoldering soldered joints, an electrically conductive wick or braid, used to absorb molten solder from the joint, is connected to a ground conductor of the circuit of which the joint forms a part, thus preventing possible damage to voltage-sensitive circuit components, for example FET's. A solder-absorbent conductive wick is provided with connecting means for connection either directly or through an intermediate conductor with a ground conductor of a circuit in which a joint is to be desoldered by the aid of the wick. Connection to the circuit conductor may be by way of a first electrical connector portion mating with a second connector portion on a circuit board carrying the circuit. The first connector portion may be mounted on a jig or locating fixture arranged to receive the circuit board. The wick may be wound on a spool and have its end electrically connected to a contact member of an electrical connector portion mounted on the spool and connected to the circuit by way of a wire having appropriate connector portions at its ends.

8 Claims, 3 Drawing Figures

DESOLDERING METHOD AND APPARATUS

CROSS-REFERENCE TO RELATED APPLICATION

The solder-absorbent wick or braid used in the invention is advantageously flux-coated by the method described in the Applicant's co-pending Application Ser. No. 681,843 for IMPROVED METHOD OF FLUX COATING METAL WICK AND APPARATUS THEREFOR.

BACKGROUND OF THE INVENTION

1. Field of the Invention

This invention relates to an improved method of desoldering, that is of removing solder from joints by which electronic components are electrically connected in a circuit.

2. Description of the Prior Art

Known methods of desoldering using suction to remove the solder after this has been melted by the application of a heated tip to the joint, either by using a soldering iron having at its tip a channel connected to a suction source, or by using a normal soldering iron and manually operated suction device employing a resilient bulb, are found to give rise at the site of the desoldering application to electrostatic charges which may cause damage to sensitive electronic components, such as field-effect transistors.

A similar difficulty may arise when using a metal wick or braid for removing molten solder from electronic circuit joints to be unsoldered, because the operative performing the unsoldering operation usually holds the braid in his fingers and an electrostatic potential applied to the joint from the soldering device or even from the person of the operator by way of the wick or braid may be sufficient to cause damage to sensitive electronic components.

SUMMARY OF THE INVENTION

It is an object of the invention to provide an improved desoldering method in which damage to voltage-sensitive components is prevented.

It is a further object of the invention to provide an improved desoldering method which prevents the inadvertent application of undesirable potential to an electric circuit containing a joint to be desoldered.

It is another object of the invention to provide desoldering apparatus facilitating the safe desoldering of joints in electric circuits.

It is a specific object of the present invention to provide a method of desoldering a soldered joint in an electronic circuit which comprises placing in electrical contact with the joint a metal wick or braid which is electrically connected to a grounded portion of the electronic circuit and heating the solder of the joint to its melting point.

It will be understood that the presence of the grounded metal wick or braid in electrical contact with the joint will prevent any potential different from ground potential from appearing at the joint and will thus ensure that deleterious potentials cannot be applied to sensitive components in the circuit.

In one manner of carrying out the invention a length of metal desoldering wick is provided at one end with a spring clip or other means convenient to establish an electrical connection between the wick and ground portion of an electronic circuit including a joint to be desoldered. The connecting means is applied to the circuit to produce the required connection of the wick to the grounded earthed circuit portion and the other end of the braid is applied to the joint to be soldered before the solder is melted, thus preventing the appearance of undesired electrical potentials upon the conductors of the joint.

In an alternative manner of carrying out the invention a solder-absorbent wick is provided at one end with a means convenient for the connection of an electrically conductive wire and is connected to an grounded portion of an electronic circuit by means of a wire connected to an appropriate circuit conductor and to the wick before being used as above described in unsoldering a joint in the circuit.

When a supply of desoldering wick is carried on a synethic plastic spool or reel, as is often the case, it is convenient to provide on the spool a portion of an electrical connector, to which portion the inner end of the wick is electrically connected. A flexible electrical conductor provided at one end with a connector portion matable with that on the spool, and at its other end with a spring clip or other means convenient for establishing electrical connection to a grounded portion of a circuit containing a joint to be desoldered.

If, as is sometimes the case, an operator is required to deal with electronic circuits carried in a jig or other locating fixture, it will often be convenient for the electrical connection of the wick to the circuit to be effected by way of a connecting means provided on the jig or fixture to receive electrical connecting means provided on the electronic circuit.

DESCRIPTION OF THE PREFERRED EMBODIMENTS

Figure 1:
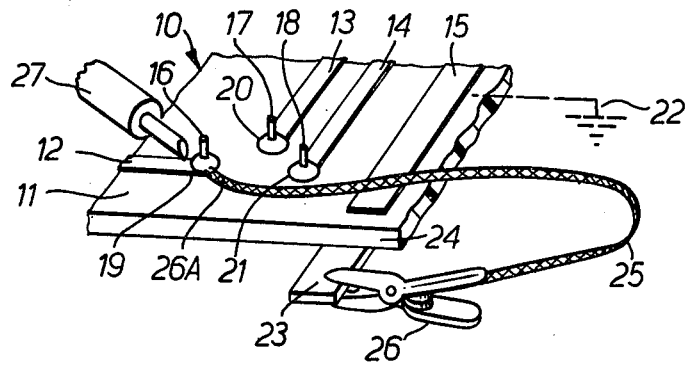
FIG. 1 illustrates the operation of unsoldering a joint in an electronic circuit by the method of the invention.

In FIG. 1 there is shown a fragment 10 of a printed circuit board 11 carrying an electronic circuit. The circuit conductors lie on that face of the board that is shown as uppermost in the drawing. Four such conductors are shown at 12, 13, 14 and 15. An electronic component beneath the board has wire ends 16, 17, 18 that extend upwardly through holes in the board and are connected to conductors 12–14 by soldered joints 19–21. Conductor 15 of the printed circuit board 11 is a grounded conductor as is indicated by ground symbol 22 and is electrically connected to a contact member 23 that extends beyond the edge 24 of the board 11.

To desolder joint 19 in accordance with the invention one end of a length of solder-absorbent wick or braid 25 is electrically connected to grounded conductor 15 of circuit board 11. This may be effected most conveniently by providing wick 25 with a spring clip 26 suitable to grip contact member 23 or some other accessible portion of a grounded conductor of the circuit. Alternatively, wick 25 may be provided with an electrical connector portion matable with a circuit board connector so as to establish the required connection. The free end 26A is applied to joint 19, thus ensuring that this joint is held at ground potential and the solder of the joint is then melted by the application of a soldering iron 27 or in other known manner.

Figure 2:
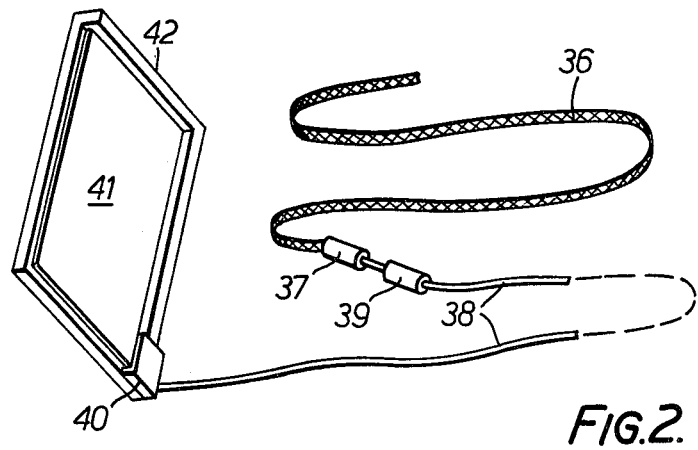
FIG. 2 illustrates improved means for performing the method of FIG. 1.

FIG 2 shows an alternative arrangement of desoldering wick convenient for carrying out the invention. A length of metal wick or braid 36 is provided at one end with an electrical connector portion 37. A flexible electrical conductor 38 is provided at one end with an electrical connector portion 39 matable with connector portion 37 to establish electrical connection between wick 36 and conductor 38. At the other end of flexible conductor 38 is provided an electrical connector portion 40 matable with a grounded conductor of the electronic circuit of which a joint is to be desoldered.

When desoldering operations are required to be carried out on a plurality of similar structural units for example, printed circuit boards, such as 41, it will often be convenient to arrange that connector portion 40 is secured to a jig or locating fixture 42 suitable to receive one of the structural units, so that the necessary connection of wick 36 to a grounded circuit conductor is necessarily established by the act of inserting the structural unit in the jig or fixture.

Figure 3:
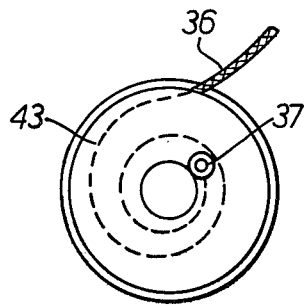
FIG. 3 illustrates a modification of the means shown in FIG. 2.

FIG. 3 shows a modification of the arrangement of desoldering wick shown in FIG. 2. It is known to provide desoldering wick on a synthetic plastic spool. In the arrangement shown in FIG. 3, a synthetic plastic spool 43 carrying a length of desoldering wick 36 is provided with an electrical connector portion 37 to which the inner end of wick 36 is connected. As for the arrangement of FIG. 2, connector 37 will be used to establish electrical connection between the desoldering wick 36 and a grounded conductor of an electronic circuit before the wick is used to desolder a joint in the circuit.

I claim:

1. Apparatus for desoldering a soldered joint between two electrically conductive components of a circuit, comprising
    a. a length of conductive solder-absorbent braid, said length of braid being free at one end for direct engagement with the soldered joint; and
    b. ground connection means connected with the other end of said length of braid for connecting said braid with ground, whereby when the soldered joint is heated to melt the solder thereof, the melted solder is removed from the joint by absorption by said one braid length end, and any potential difference appearing across the joint is reduced to ground potential via the length of braid.

2. Apparatus as defined in claim 1, wherein said ground connection means comprises a spring clip.

3. Apparatus as defined in claim 1, wherein said ground connection means includes separable connector means.

4. Apparatus as defined in claim 3, and further including spool means upon which said length of braid is wound, said separable connector means including a pair of connector elements one of which is mounted on said spool means.

5. Desoldering apparatus for removing the solder from a soldered joint between two electrical components of a circuit mounted on a structural unit, said circuit including a ground conductor, comprising
    a. jig means for supporting the structural unit;
    b. first connector means (40) connected with said jig means for electrical engagement with the ground conductor of the circuit;
    c. a flexible conductor (38) connected at one end with said first connector means;
    d. a length of conductive solder-absorbent braid (36), said length of braid being free at one end for direct engagement with the soldered joint; and
    e. second connector means (37,39) for connecting the other ends of said flexible conductor and said braid, respectively, whereby when the soldered joint is heated to melt the solder thereof, the melted solder is removed from the joint by absorption by said one braid length end, and any potential difference appearing across the joint is reduced to ground potential via said braid length, said second connector means, said flexible conductor, and said first connector means.

6. A method for desoldering a soldered joint between two electrical components of a circuit, which comprises the steps of
    a. connecting one end of a length of conductive solder-absorbing braid with ground;
    b. placing the other end of said length of braid in engagement with the joint; and
    c. heating the joint to melt the solder thereof, whereby the solder is removed by the capillary action of the wick, and the potential difference across the joint is reduced to ground potential via the length of braid.

7. The method as defined in claim 6, wherein the circuit includes a ground conductor, and further wherein the connecting step includes connecting the said one end of the briad length with the ground conductor by a conductive spring clip.

8. The method as defined in claim 6, wherein the circuit is arranged on a circuit board and includes a ground conductor, and further including the preliminary step of mounting the circuit board in a jig, said ground connecting step including the steps of mounting one end of a flexible conductor on said jig in electrical engagement with the ground conductor, and electrically connecting the other ends of said flexible conductor and said length of braid, respectively.

* * * * *